(12) United States Patent
Zhang et al.

(10) Patent No.: US 11,570,375 B2
(45) Date of Patent: Jan. 31, 2023

(54) SPACE DEBRIS OBSERVATION METHOD BASED ON ALTERNATING EXPOSURE TIMES OF CHARGE COUPLED DEVICE (CCD) CAMERA

(71) Applicant: Purple Mountain Observatory, Chinese Academy of Sciences, Nanjing (CN)

(72) Inventors: Xiaoxiang Zhang, Nanjing (CN); Xin Gao, Nanjing (CN); Xiyu Li, Nanjing (CN)

(73) Assignee: Purple Mountain Observatory, Chinese Academy of Sciences, Nanjing (CN)

( * ) Notice: Subject to any disclaimer, the term of this patent is extended or adjusted under 35 U.S.C. 154(b) by 0 days.

(21) Appl. No.: 17/638,203

(22) PCT Filed: Jul. 16, 2020

(86) PCT No.: PCT/CN2020/102314
§ 371 (c)(1),
(2) Date: Feb. 25, 2022

(87) PCT Pub. No.: WO2021/036565
PCT Pub. Date: Mar. 4, 2021

(65) Prior Publication Data
US 2022/0345610 A1    Oct. 27, 2022

(30) Foreign Application Priority Data
Aug. 27, 2019   (CN) .......................... 201910794093.2

(51) Int. Cl.
*H04N 5/235* (2006.01)
*G06T 7/70* (2017.01)
(Continued)

(52) U.S. Cl.
CPC .......... *H04N 5/2353* (2013.01); *G06T 7/194* (2017.01); *G06T 7/70* (2017.01); *G06V 20/13* (2022.01);
(Continued)

(58) Field of Classification Search
CPC .......... H04N 5/2353; G06T 7/194; G06T 7/70
(Continued)

(56) References Cited

U.S. PATENT DOCUMENTS

2006/0110007 A1\* 5/2006 Yanagisawa .............. G06T 7/73
382/103

FOREIGN PATENT DOCUMENTS

| CN | 101846511 A | 9/2010 |
| CN | 101929859 A | 12/2010 |

(Continued)

OTHER PUBLICATIONS

Zhang Xiao-Xiang, et al., Study on the effect of rolling shutter sCMOS camera on space debris observation, Optics and Precision Engineering, 2018, pp. 1441-1449, vol. 26 No. 6.
(Continued)

*Primary Examiner* — Amir Shahnami
(74) *Attorney, Agent, or Firm* — Bayramoglu Law Offices LLC (57) ABSTRACT

A space debris observation method based on alternating exposure times of a charge coupled device (CCD) camera is provided. The present disclosure controls the CCD camera to acquire consecutively and alternately short-exposure and long-exposure images based on preset exposure times. The present disclosure realizes detection and astronomical positioning of low-orbit, medium-orbit and high-orbit space debris by processing short-exposure images of odd-numbered frames. The present disclosure realizes detection of medium-orbit and high-orbit space debris by processing
(Continued)

long-exposure images of even-numbered frames, and realizes astronomical positioning of the medium-orbit and high-orbit space debris detected in a current frame through plate constant model coefficients of adjacent odd-numbered frames. In addition, in a search mode, the present disclosure realizes precise astronomical positioning of low-orbit, medium-orbit and high-orbit space debris through a multi-point adjustment method and the plate constant model coefficients of adjacent odd-numbered frames.

8 Claims, 2 Drawing Sheets

(51) Int. Cl.
  *G06T 7/194* (2017.01)
  *G06V 20/13* (2022.01)
(52) U.S. Cl.
  CPC ............... *G06T 2207/10032* (2013.01); *G06T 2207/10144* (2013.01)
(58) Field of Classification Search
  USPC ........................................................ 348/135
  See application file for complete search history.

(56) References Cited

FOREIGN PATENT DOCUMENTS

| | | |
|---|---|---|
| CN | 102374856 A | 3/2012 |
| CN | 102494674 A | 6/2012 |
| CN | 105910583 A | 8/2016 |
| CN | 108180903 A | 6/2018 |
| CN | 110399866 A | 11/2019 |
| EP | 1168003 B1 | 5/2009 |
| EP | 2894842 A1 | 7/2015 |
| JP | 2011218834 A | 11/2011 |
| WO | 2014038629 A1 | 3/2014 |

OTHER PUBLICATIONS

Sun Rong-Yu, et al., A Method for Detecting Space Debris Based on Apriori Information, Chinese Astronomy and Astrophysics, 2013, pp. 464-472, vol. 37.

Sun Rong-Yu, et al., A Method of Detecting Space Debris Based on Prior Information, Acta Astronomica Sinica, 2013, pp. 168-175, vol. 54 No. 2.

Rong-Yu Sun, et al., Optical Survey Technique for Space Debris in GEO, Progress in Astronomy, 2012, pp. 394-410, vol. 30 No. 3.

Rong-Yu Sun, et al., A new source extraction algorithm for optical space debris observation , Research in Astronomy and Astrophysics, 2013, pp. 604-614, vol. 13 No .5.

Rong-Yu Sun, et al., Algorithms and applications for detecting faint space debris in GEO, Acta Astronautica, 2015, pp. 9-17, vol. 110.

Rong-Yu Sun, et al., Improved astrometry of space debris with image restoration , Research in Astronomy and Astrophysics, 2014, pp. 992-1000, vol. 14 No.8.

Hu Jing-Jing, et al., Evaluation Model of Detected Ability for Ground-based Electro-optic Telescope to Space Debris, Acta Photonica Sinica, 2016, pp. 1012002-1-6, vol. 45 No. 10.

Huiyan Zhang, et al., The GEO satellites and Space Debris Optical Angle Measuring System, IEEE International Conference on Computer Science and Automation Engineering (CSAE), 2012, pp. 358-362.

\* cited by examiner

SPACE DEBRIS OBSERVATION METHOD BASED ON ALTERNATING EXPOSURE TIMES OF CHARGE COUPLED DEVICE (CCD) CAMERA

CROSS REFERENCE TO THE RELATED APPLICATIONS

This application is the national phase entry of International Application No. PCT/CN2020/102314, filed on Jul. 16, 2020, which is based upon and claims priority to Chinese Patent Application No. 201910794093.2, filed on Aug. 27, 2019, the entire contents of which are incorporated herein by reference.

TECHNICAL FIELD

The present disclosure relates to the technical field of space debris observation, and in particular, to a space debris observation method based on alternating exposure times of a charge coupled device (CCD) camera.

BACKGROUND

In scientific research, military and other fields, in order to monitor space debris, it is necessary to acquire the location and variation of the space debris in the sky at every moment, and to determine the orbit of the space debris, so as to acquire accurate information about the space debris.

In the traditional observation method, the CCD camera basically acquires images within a certain period of time based on a fixed exposure time, whether in a tracking mode or in a search mode.

In the tracking mode, in order to improve the detection success rate of dim low-orbit, medium-orbit and high-orbit space debris, the exposure time must be prolonged. However, this will cause the background star to be lengthened too excessively to achieve the astronomical positioning of the low-orbit, medium-orbit and high-orbit space debris, especially low-orbit targets with fast apparent motion.

In the search mode of tracking star or static waiting, the exposure time of the CCD camera is usually long, which is conductive to the detection of medium-orbit and high-orbit space debris. However, it will cause the image of low-orbit space debris to be lengthened and the number of pixels to increase, which will result in the failure of the detection of the low-orbit space debris. In addition, a longer exposure time of the CCD camera will lead to a longer background star, resulting in a decrease in the positioning accuracy of the gray-scale centroid of the star, thereby reducing the astronomical positioning accuracy of the space debris detected.

In summary, the traditional observation method has the following three problems:

(1) The short exposure of the CCD camera is beneficial for low-orbit space debris detection and ensures the astronomical positioning accuracy, but may lead to a failure of the detection of dim medium-orbit and high-orbit space debris.

(2) In the tracking mode, the long exposure of the CCD camera is conducive to the detection of dim low-orbit, medium-orbit and high-orbit space debris, but will lead to a reduced accuracy or even a failure of the astronomical positioning of the low-orbit, medium-orbit and high-orbit space debris.

(3) In the constant-motion search mode, the long exposure of the CCD camera is suitable for the detection of dim medium-orbit and high-orbit space debris, and ensures the astronomical positioning accuracy. However, it will cause a failure of the detection of low-orbit space debris due to the excessive lengthening problem in the low-orbit space debris.

SUMMARY

An objective of the present disclosure is to provide a space debris observation method based on alternating exposure times of a CCD camera. The present disclosure combines the advantages of different exposure times, such as short exposure and long exposure, to achieve simultaneous detection and precise astronomical positioning of space debris in various orbits. The present disclosure improves the observation efficiency and measurement accuracy of observation equipment for space debris in various orbits.

Figure 1:
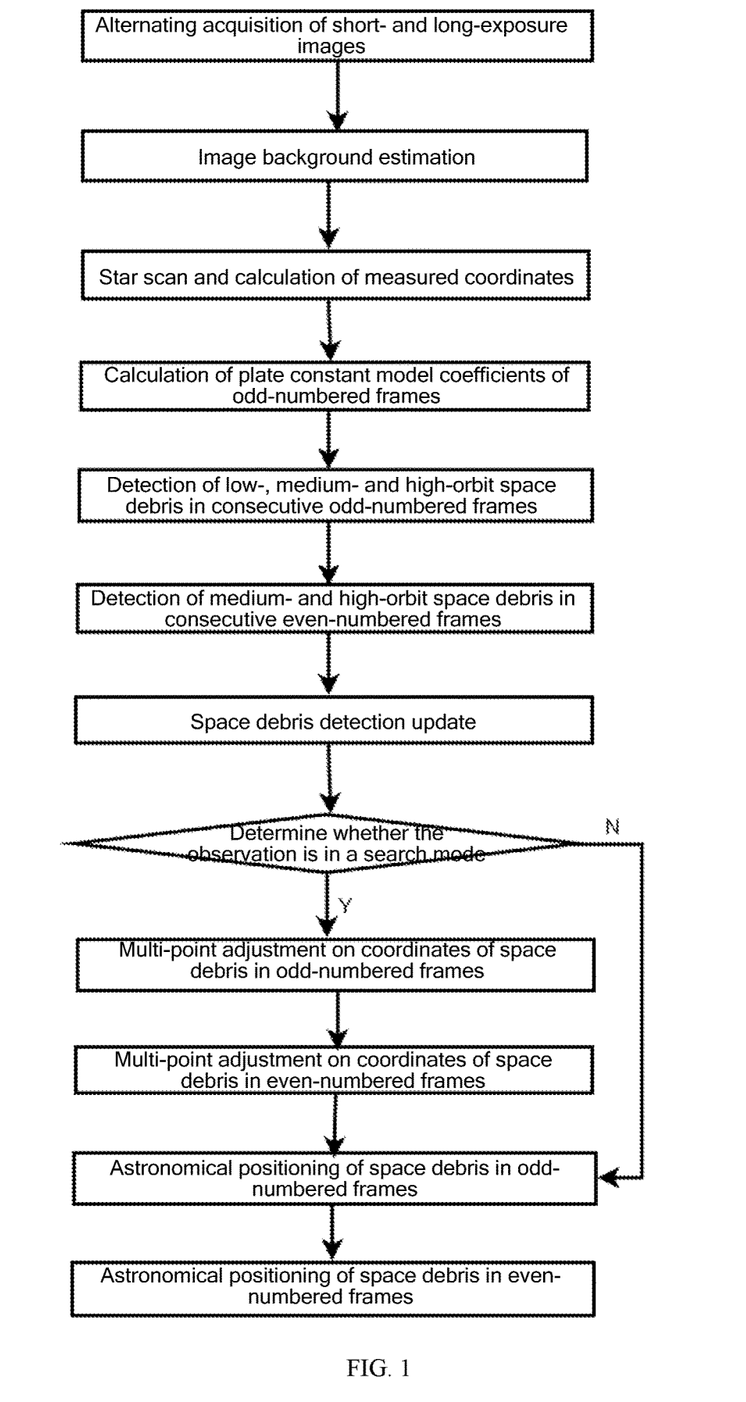
FIG. 1 is a flowchart of a space debris observation method based on alternating exposure times of a CCD camera according to the present disclosure.

To achieve the above objective, the present disclosure proposes a space debris observation method based on alternating exposure times of a CCD camera. As shown in FIG. 1, the observation method includes:

S1: alternately acquiring, by a CCD camera, (2n+1) frames including space debris and background stars in a designated area based on a preset first exposure time and a preset second exposure time, where the first exposure time is used to acquire odd-numbered frames, the second exposure time is used to acquire even-numbered frames, and the first exposure time is less than the second exposure time; and n is a positive integer greater than or equal to 3;

S2: estimating an image background;

S3: subjecting each of the frames to a full-frame scan based on an image background estimation result, and calculating two-dimensional (2D) plane coordinates (x,y) of all stars in each of the frames, where an upper left corner of the images serves as an origin of coordinates (0,0), a right side of the images indicates an increasing direction of an x-axis, and a lower side of the images indicates an increasing direction of a y-axis; and x indicates a distance between a position of a star in the image and the origin of the coordinates in an x-axis direction, and y indicates a distance between the position of the star in the image and the origin of the coordinates in a y-axis direction;

S4: calculating plate constant model coefficients of (n+1) odd-numbered frames based on the 2D plane coordinates (x,y) of all stars in the odd-numbered frames:

S5: detecting, by using a preset detection method, low-orbit, medium-orbit and high-orbit space debris included in all the odd-numbered frames based on consecutive odd-numbered frames;

S6: detecting, by using the preset detection method, medium-orbit and high-orbit space debris included in all the even-numbered frames based on consecutive even-numbered frames;

S7: calculating all the detected space debris in the designated area based on respective space debris detection results of the odd-numbered frames and the even-numbered frames and a preset threshold; determining whether the observation is in a search mode; and proceeding to step S8 if yes, or proceeding to step S10 if not;

S8: in the search mode, acquiring, based on the space debris detection results of all the odd-numbered frames, coordinates information of each of the low-orbit, medium-orbit and high-orbit space debris included in the odd-numbered frames after a multi-point adjustment on each of the odd-numbered frames through a multi-point adjustment method;

S9: in the search mode, acquiring, based on the space debris detection results of all the even-numbered frames, coordinates information of each of the medium-orbit and high-orbit space debris included in the even-numbered frames after a multi-point adjustment on each of the even-numbered frames through the multi-point adjustment method;

S10: performing astronomical positioning of the space debris in the odd-numbered frames based on the coordinates information of the low-orbit, medium-orbit and high-orbit space debris included in each of the odd-numbered frames and the corresponding plate constant model coefficients of the odd-numbered frames; and S11: performing astronomical positioning of the space debris in the even-numbered frames based on the coordinates information of the space debris in each of the even-numbered frames and the plate constant model coefficients of two adjacent odd-numbered frames.

In a further embodiment, the S4: calculating plate constant model coefficients of (n+1) odd-numbered frames based on the 2D plane coordinates (x,y) of all stars in the odd-numbered frames includes:

if a plate constant model is $$\begin{cases} \xi = a + bx + cy \\ \zeta = d + ex + fy \end{cases};$$

calculating, by using a least squares method, the plate constant model coefficients of the (n+1) odd-numbered frames as $$\begin{cases} a^{2i-1}, & b^{2i-1}, & c^{2i-1} \\ d^{2i-1}, & e^{2i-1}, & f^{2i-1} \end{cases},$$

i=1, 2, . . . , n+1 based on the 2D plane coordinates (x,y) of all the stars in the odd-numbered frames; and if the plate constant model is $$\begin{cases} \xi = a_1 + b_1 x + c_1 y + d_1 x^2 + e_1 xy + f_1 y^2 \\ \zeta = a_2 + b_2 x + c_2 y + d_2 x^2 + e_2 xy + f_2 y^2 \end{cases};$$

calculating, by using the least squares method the late constant model coefficients of the (n+1) odd-numbered frames as $$\begin{cases} a_1^{2i-1}, b_1^{2i-1}, c_1^{2i-1} d_1^{2i-1}, e_1^{2i-1}, f_1^{2i-1} \\ a_2^{2i-1}, b_2^{2i-1}, c_2^{2i-1} d_2^{2i-1}, e_2^{2i-1}, f_2^{2i-1} \end{cases},$$

i=1, 2, . . . , n+1 based on the 2D plane coordinates (x,y) of all the stars in the odd-numbered frames.

In a further embodiment, in steps S5 and S6, the preset detection method may include: identifying and eliminating background stars in all the images, acquiring track characteristics of remaining stars in all the images with the background stars eliminated, and detecting all space debris in the images.

In a further embodiment, the S8: in the search mode, acquiring, based on the space debris detection results of all the odd-numbered frames, coordinates information of each of the space debris in the odd-numbered frames after a multi-point adjustment through a multi-point adjustment method may include:

supposing that there are $k_{2i-1}$ space debris in an i-th odd-numbered frame, and acquiring measured coordinates information $(t_{2i-1}, x_j^{2i-1}, y_j^{2i-1})$ of each of the space debris, where $t_{2i-1}$ is an observation time corresponding to the i-th odd-numbered frame, j=1, 2, . . . , $k_{2i-1}$, i=1, 2, . . . , n+1; and calculating, by using a least squares method, $a_0$, $b_0$, $a_1$, $b_1$, $a_2$, $b_2$ in $$\begin{cases} x = a_0 + a_1 t + a_2 t^2 \\ y = b_0 + b_1 t + b_2 t^2 \end{cases},$$

and acquiring fitted coordinates information $(t_{2i-1}, X_j^{2i-1}, Y_j^{2i-1})$ of each of the space debris in the odd-numbered frame after a multi-point adjustment.

In a further embodiment, the S9: in the search mode, acquiring, based on the space debris detection results of all the even-numbered frames, coordinates information of each of the space debris in the even-numbered frames after a multi-point adjustment through a multi-point adjustment method may include:

supposing that there are $k_{2m}$ space debris in an m-th even-numbered frame, and acquiring measured coordinates information $(t_{2m}, x_h^{2m}, y_h^{2m})$ of each of the space debris, where $t_{2m}$ is an observation time corresponding to the m-th even-numbered frame, h=1, 2, . . . , $k_{2m}$, m=1, 2, . . . , n; and calculating, by using a least squares method, $a_0$, $b_0$, $a_1$, $b_1$, $a_2$, $b_2$ in $$\begin{cases} x = a_0 + a_1 t + a_2 t^2 \\ y = b_0 + b_1 t + b_2 t^2 \end{cases},$$

and acquiring fitted coordinates information $(t_{2m}, X_h^{2m}, Y_h^{2m})$ of each of the space debris in the even-numbered frame after a multi-point adjustment.

In a further embodiment, the S10: performing astronomical positioning of the space debris in the odd-numbered frames based on the coordinates information of the low-orbit, medium-orbit and high-orbit space debris included in each of the odd-numbered frames and the corresponding plate constant model coefficients of the odd-numbered frames may include:

performing, if the observation is in a tracking mode, astronomical positioning of the space debris in the odd-numbered frame through the plate constant model coefficients of the i-th odd-numbered frame and the measured coordinates information $(t_{2i-1}, x_j^{2i-1}, y_j^{2i-1})$, j=1, 2, . . . , $k_{2i-1}$, i=1, 2, . . . , n+1, of the space debris in the i-th odd-numbered frame; and performing, if the observation is in a search mode, astronomical positioning of the space debris in the odd-numbered frame through the plate constant model coefficients of the i-th odd-numbered frame and the fitted coordinates information $(t_{2i-1}, X_j^{2i-1}, Y_j^{2i-1})$, j=1, 2, . . . i=1, 2, . . . , n+1, of the space debris in the i-th odd-numbered frame after the multi-point adjustment.

In a further embodiment, the S11: performing astronomical positioning of the space debris in the even-numbered frames based on the coordinates information of the space debris in each of the even-numbered frames and the plate constant model coefficients of two adjacent odd-numbered frames may include:

performing, if the observation is in a tracking mode, astronomical positioning of the space debris in the even-numbered frame through the plate constant model coefficients of $(2^m-1)$-th and $(2^{m+1})$-th odd-numbered frames and the measured coordinates information $(t_{2m}, x_h^{2m}, y_h^{2m})$ of the space debris in a $2^m$-th even-numbered frame; and performing, if the observation is in a search mode, astronomical positioning of the space debris in the even-numbered frame through the plate constant model coefficients of the $(2^m-1)$-th and $(2^{m+1})$-th odd-numbered frames and the fitted coordinates information $(t_{2m}, X_h^{2m}, Y_h^{2m})$ of the space debris in the $2^m$-th even-numbered frame after the multipoint adjustment.

In a further embodiment, the observation method may further include:

sending image background estimation results, calculated 2D plane coordinates (x,y) of all the stars in each of the frames, detection results of the space debris in each of the images and/or astronomical positioning results to a measurement system.

In the present disclosure, the space debris observation method based on alternating exposure times of a CCD camera involves three parts.

1. Alternating Acquisition of Image Data with Short and Long Exposures

Multiple frames of images including space debris and background stars are acquired through a measurement system, and the acquired images are arranged in chronological order. For ease of description, it is assumed that odd-numbered frames are acquired by a short exposure mode, and even-numbered frames are acquired by a long exposure mode. The backgrounds of the acquired multiple frames are estimated. All the acquired frames are subjected to a full-frame scan according to the image background estimation results, and the 2D plane coordinates (x,y) of all stars in the frames are calculated. In addition, based on the 2D plane coordinates (x,y) of the stars in the odd-numbered frames, the plate constant model coefficients of (n+1) odd-numbered frames are calculated. The acquired data lays the foundation for subsequent space debris detection and astronomical positioning.

2. Detection of Space Debris in Various Orbits

Short-exposure images are suitable for detecting low-orbit space debris and ensuring astronomical positioning accuracy, but they are not suitable for detecting medium-orbit and high-orbit space debris. The detection accuracy of long-exposure images is related to the working mode. In the tracking mode, the long-exposure images are suitable for detecting space debris in various orbits, but they have low astronomical positioning accuracy. In the search mode, the long-exposure images are suitable for detecting medium-orbit and high-orbit space debris and ensuring astronomical positioning accuracy, but they have a poor performance in the detection of low-orbit space debris. In other words, the space debris clearly identified in the short-exposure images and the long-exposure images may be different. In fact, combining the space debris in the short-exposure images with the space debris in the long-exposure images is a way to detect all the space debris in the designated space area. Therefore, in this step, the images are divided into two batches, namely short-exposure images of odd-numbered frames and long-exposure images of even-numbered frames. A space debris detection method in the prior art is used to detect space debris included in the two batches of images. The detection results of these two batches of images are combined for a comprehensive analysis, and duplicate space debris are deleted based on a preset threshold, so as to obtain all the space debris included in the specified space area.

3. Astronomical Positioning of Space Debris in Various Orbits

Since the observation modes of the even-numbered frames and odd-numbered frames are different, the positioning methods used are also different. The even-numbered frames mainly include low-orbit space debris. The plate constant model coefficients of adjacent odd-numbered frames are used to perform the astronomical positioning of the medium-orbit and high-orbit space debris detected in the current frame. In different working modes, the positions of the space debris included in the odd-numbered frames are different. However, the precise astronomical positioning of the detected space debris can be achieved through the multi-point adjustment method and the plate constant model coefficients of the current odd-numbered frame. The coordinates of the space debris in the odd-numbered frames and the even-numbered frames of different working modes are different. For example, in the tracking mode, the measured coordinates information based on the original 2D plane coordinates is used, while in the search mode, the fitted coordinates information after multi-point adjustment is used.

Compared with the prior art, the technical solution of the present disclosure has the following significant beneficial effects:

(1) The present disclosure combines the advantages of different exposure times, such as short exposure and long exposure, to achieve simultaneous detection and precise astronomical positioning of space debris in various orbits. The present disclosure improves the success rate of dim target detection, and improves the observation efficiency of observation equipment.

(2) The present disclosure achieves high observation efficiency and measurement accuracy without being affected by the image acquisition mode, that is, the tracking mode and the search mode.

(3) The present disclosure adopts the space debris detection method in the prior art to detect space debris in even-numbered frames and odd-numbered frames, and can detect all visible space debris in the specified space area. The present disclosure is widely applicable and can be popularized.

(4) The present disclosure performs the steps of image acquisition, processing, space debris detection and astronomical positioning in a pipeline manner. The present disclosure has high space debris observation efficiency, and is convenient for users to grasp the observation progress in real time and adjust the observation parameters in time.

It should be understood that all combinations of the above concepts and additional concepts that will be described in more detail below, such as the alternating acquisition of short-, medium-orbit and long-exposure images, are regarded as part of the inventive subject matter of the present disclosure without conflict. In addition, all combinations of the claimed subject matter are also regarded as part of the inventive subject matter of the present disclosure.

The foregoing and other aspects, embodiments and features of the present disclosure can be more fully understood from the following description with reference to the drawings. Other additional aspects of the present disclosure, such as the features and/or beneficial effects of the exemplary embodiments, will be apparent in the following description, or learned through practice according to the specific implementations of the present disclosure.

BRIEF DESCRIPTION OF THE DRAWINGS

The drawings are not intended to be drawn to scale. The same or approximately the same components shown in the drawings may be represented by the same reference numerals. For the sake of clarity, not every component in every drawing is labeled. The embodiments of various aspects of the present disclosure will be described below through examples and with reference to the drawings.

DETAILED DESCRIPTION OF THE EMBODIMENTS

For a better understanding of the technical content of the present disclosure, the present disclosure is described below with reference to some specific embodiments and the drawings.

Specific Embodiment 1

For ease of description, the observation method of the present disclosure will be described below by taking long and short exposure times as an example.

The present disclosure provides a space debris observation method based on alternating exposure times of a CCD camera. As shown in FIG. 1, the observation method includes:

S1: Alternately acquire, by a CCD camera, (2n+1) frames including space debris and background stars in a designated area based on a preset first exposure time and a preset second exposure time, where the first exposure time is used to acquire odd-numbered frames, the second exposure time is used to acquire even-numbered frames, and the first exposure time is less than the second exposure time; and n is a positive integer greater than or equal to 3.

S2: Estimate an image background.

S3: Subject each of the frames to a full-frame scan based on an image background estimation result, and calculate 2D plane coordinates (x,y) of all stars in each of the frames, where an upper left corner of the images serves as an origin of coordinates (0,0), a right side of the images indicates an increasing direction of an x-axis, and a lower side of the images indicates an increasing direction of a y-axis; and x indicates a distance between a position of a star in the image and the origin of the coordinates in an x-axis direction, and y indicates a distance between the position of the star in the image and the origin of the coordinates in a y-axis direction.

S4: Calculate plate constant model coefficients of (n+1) odd-numbered frames based on the 2D plane coordinates (x,y) of all stars in the odd-numbered frames.

S5: Detect, by using a preset detection method, low-orbit, medium-orbit and high-orbit space debris included in all the odd-numbered frames based on consecutive odd-numbered frames.

S6: Detect, by using the preset detection method, medium-orbit and high-orbit space debris included in all the even-numbered frames based on consecutive even-numbered frames.

S7: Calculate all the detected space debris in the designated area based on respective space debris detection results of the odd-numbered frames and the even-numbered frames and a preset threshold; determine whether the observation is in a search mode; and proceed to step S8 if yes, or proceed to step S10 if not.

S8: In the search mode, acquire, based on the space debris detection results of all the odd-numbered frames, coordinates information of each of the low-orbit, medium-orbit and high-orbit space debris included in the odd-numbered frames after a multi-point adjustment on each of the odd-numbered frames through a multi-point adjustment method.

S9: In the search mode, acquire, based on the space debris detection results of all the even-numbered frames, coordinates information of each of the medium-orbit and high-orbit space debris included in the even-numbered frames after a multi-point adjustment on each of the even-numbered frames through the multi-point adjustment method.

S10: Perform astronomical positioning of the space debris in the odd-numbered frames based on the coordinates information of the low-orbit, medium-orbit and high-orbit space debris included in each of the odd-numbered frames and the corresponding plate constant model coefficients of the odd-numbered frames.

S11: Perform astronomical positioning of the space debris in the even-numbered frames based on the coordinates information of the space debris in each of the even-numbered frames and the plate constant model coefficients of two adjacent odd-numbered frames.

In order to overcome the shortcomings of traditional space debris observation method for any space debris measurement system, the present disclosure provides the space debris observation method based on alternating exposure times of a CCD camera. The present disclosure controls the CCD camera to consecutively and alternately acquire short- and long-exposure images based on preset exposure times. In the acquired image sequence, odd-numbered frames are short-exposure images, and even-numbered frames are long-exposure images. The present disclosure realizes detection and astronomical positioning of low-orbit, medium-orbit and high-orbit space debris by processing short-exposure images of odd-numbered frames. The present disclosure realizes detection of medium-orbit and high-orbit space debris by processing long-exposure images of even-numbered frames, and realizes astronomical positioning of the medium-orbit and high-orbit space debris detected in the current frame through the plate constant model coefficients of adjacent odd-numbered frames. In addition, in the search mode, the present disclosure realizes precise astronomical positioning of low-orbit, medium-orbit and high-orbit space debris through the multi-point adjustment method and the plate constant model coefficients of adjacent odd-numbered frames. Tests have shown that the present disclosure replaces the traditional method for observing space debris in low-orbit and medium-orbit, and makes up for the shortcomings of the traditional method for observing space debris. The present disclosure realizes simultaneous observation of low-orbit, medium-orbit and high-orbit space debris, improves the observation efficiency and measurement accuracy of observation equipment, and becomes one of the effective means for monitoring space debris.

The steps of the space debris observation method based on alternating exposure times of a CCD camera provided by the present disclosure are described in detail below.

Step 1. Alternating Acquisition of Short- and Long-Exposure Images

For example, a short exposure time of the CCD camera (usually less than 100 ms) and a long exposure time of the CCD camera (usually less than 500 ms) are set, and 2n+1 consecutive frames are alternately acquired based on the short and long exposure times. Preferably, n is a positive integer greater than or equal to 3.

Step 2. Image Background Estimation

The 2n+1 frames including space debris and background stars are comprehensively analyzed one by one, and a mathematical model of image background estimation is established to speed up the background estimation of each frame.

The image background estimation model is established by performing a comprehensive analysis of multiple frames including space debris and background stars. Preferably, algorithms such as machine learning (ML) can be used to establish the image background estimation model.

Step 3. Star Scan and Calculation of Measured Coordinates

The original images including space debris and background stars are subjected to a full-frame scan based on the background estimation results and a preset threshold, and the 2D plane coordinates (x,y) of all stars in each frame are calculated.

Step 4. Calculation of Plate Constant Model Coefficients of Odd-Numbered Frames

According to the measured 2D plane coordinates (x,y) of all stars in the odd-numbered frames, the plate constant model coefficients are calculated through a preset plate constant model.

(1) If the plate constant model is $$\begin{cases} \xi = a + bx + cy \\ \zeta = d + ex + fy \end{cases};$$

the plate constant model coefficients of (n+1) odd-numbered frames are calculated as $$\begin{cases} a^{2i-1}, b^{2i-1}, c^{2i-1} \\ d^{2i-1}, e^{2i-1}, f^{2i-1} \end{cases},$$

i=1, 2, . . . , n+1 based on the 2D plane coordinates (x,y) of all stars in the odd-numbered frames.

(2) If the plate constant model is $$\begin{cases} \xi = a_1 + b_1 x + c_1 y + d_1 x^2 + e_1 xy + f_1 y^2 \\ \zeta = a_2 + b_2 x + c_2 y + d_2 x^2 + e_2 xy + f_2 y^2 \end{cases};$$

the plate constant model coefficients of (n+1) odd-numbered frames are calculated as $$\begin{cases} a_1^{2i-1}, b_1^{2i-1}, c_1^{2i-1}, d_1^{2i-1}, e_1^{2i-1}, f_1^{2i-1} \\ a_2^{2i-1}, b_2^{2i-1}, c_2^{2i-1}, d_2^{2i-1}, e_2^{2i-1}, f_2^{2i-1} \end{cases},$$

i=1, 2, . . . , n+1 based on the 2D plane coordinates (x,y) of all stars in the odd-numbered frames.

Step 5. Detection of Low-Orbit, Medium-Orbit and High-Orbit Space Debris in Consecutive Odd-Numbered Frames The detection of low-orbit, medium-orbit and high-orbit space debris in consecutive odd-numbered frames is achieved by using a space debris detection method based on fast star data retrieval, a space debris detection method combining a three-dimensional (3D) space and a 2D plane or other space debris detection methods. The detection results of space debris in the n+1 odd-numbered frames are acquired. There are $k_{2i-1}$ space debris in the i-th odd-numbered frame, which are expressed by $(t_{2i-1}, x_j^{2i-1}, y_j^{2i-1})$. $t_{2i+1}$ is the observation time corresponding to the i-th odd-numbered frame, j 1, . . . , $k_{2i-1}$; i 1, . . . , n+1.

Step 6. Detection of Medium-Orbit and High-Orbit Space Debris in Consecutive Even-Numbered Frames The detection of medium-orbit and high-orbit space debris in consecutive even-numbered frames is achieved by using a space debris detection method based on fast star data retrieval, a space debris detection method combining a 3D space and a 2D plane or other space debris detection methods. The detection results of space debris in the n even-numbered frames are acquired. There are $k_{2i}$ space debris in the i-th even-numbered frame, which are expressed by $(t_{2i}, x_j^{2i}, y_j^{2i})$. $t_{2i}$ is the observation time corresponding to the i-th even-numbered frame, j 1, . . . , $k_{2i}$; i 1, . . . , n.

The space debris detection method used in steps 5 and 6 is not limited to a specific type. A space debris detection method in the prior art is adopted to detect space debris in even-numbered frames and odd-numbered frames, and all space debris in the specified space area can be detected. The observation method of the present disclosure is widely applicable and can be popularized. Taking the space debris detection method based on fast star data retrieval as an example, the detection process includes the following steps.

The measurement system acquires multiple frames including space debris and background stars, estimates the backgrounds of the acquired multiple images, and calculates the measured 2D plane coordinates (x,y) of all the stars in each frame. Based on the measured 2D plane coordinates (x,y) of all stars in each frame, the right ascension α and declination δ of all stars in each frame are acquired by means of astronomical positioning. According to the right ascension α and declination δ, a 3D vector of an inertial space corresponding to all stars is calculated, and theoretical 2D tangent plane coordinates (X,Y) of each star in the image are acquired. Based on the measured 2D plane coordinates (x,y) of each star in the image and the theoretical 2D tangent plane coordinates (X,Y) of each star in the image, the background stars in the image are identified by the star identification conditions and eliminated. Based on multiple frames with background stars eliminated, the track characteristics of remaining stars are acquired, and it is determined whether the track belongs to the same star. This avoids the missed detection of space debris caused by the unfixed frame frequency and inconsistent motion characteristics, and the different detection methods of space debris caused by different observation modes.

Taking three consecutive frames as an example, in a measurement step, the background of the three frames is estimated. The measured 2D plane coordinates (x,y) of all the stars in each frame are calculated, and then the right ascension α and declination δ of all the stars in each frame are calculated. According to the right ascension α and declination δ, the 3D vector of the inertial space corresponding to all the stars is calculated. The theoretical 2D tangent plane coordinates (X,Y) of each star in the image are acquired through star data retrieval, where (X,Y) are theoretical gray-scale centroid coordinates of each star. In a fitting step, the measured 2D plane coordinates (x,y) of all stars in each frame are compared with the theoretical grayscale centroid coordinates of each star acquired through star data retrieval, and the background stars in the image are identified and eliminated. Specifically, the absolute value of a difference between the measured 2D plane coordinates (x,y) of the stars in each frame and the theoretical 2D tangent plane coordinates (X,Y) of all stars in the image is calculated. If the absolute value of the difference is within a matching threshold, for example, within 1 pixel, the corresponding star is determined to be a background star, and it is eliminated. In a third step, the running track of the remaining stars except for the background stars is generated based on the coordinates of the stars in the measured frame, the fitted frame and the third frame, the track characteristics are acquired, and the space debris is detected based on the track characteristics. Specifically, the track of the space debris is converted into an angular velocity of apparent motion through the 3D space vector of the adjacent frames. It is determined whether the track belongs to the same target according to a preset target determination condition. If it meets the target determination condition, it is determined that the track belongs to the same target. Otherwise, it is determined that the track does not belong to the same target. This avoids the missed detection of space debris caused by the inconsistent frame frequency and inconsistent motion characteristics, and the different detection methods of space debris caused by different observation modes.

Step 7. Space Debris Detection Update

Based on the space debris detection results of odd-numbered and even-numbered frames, the space debris detection update is performed according to a preset threshold.

The above analysis shows that the space debris in the short-exposure image combined with the space debris in the long-exposure image can encompass all space debris in the designated space area. Therefore, the present disclosure proposes that after acquiring the space debris in each image, the repeated space debris are deleted based on a preset threshold, so as to acquire all the space debris included in the specified space area. For example, if the coordinates of two space debris respectively located on two frames differ by only one pixel (assuming the threshold is one pixel), the two space debris can be regarded as the same space debris. By analogy, the same space debris are combined, and finally all the space debris included in the specified space area are acquired.

Step 8. Multi-Point Adjustment on Coordinates of Space Debris in Odd-Numbered Frames (in Search Mode)

In the search mode, the detection results of the space debris in n+1 odd-numbered frames and the multi-point adjustment method are used to acquire the coordinates information of each space debris in the odd-numbered frames. Specifically:

Supposing that the number of space debris in the i-th odd-numbered frame is $k_{2i-1}$, the measured coordinates information $(t_{2i-1}, x_j^{2i-1}, y_j^{2i-1})$ of each of the space debris is acquired, where $t_{2i-1}$ is the observation time corresponding to the i-th odd-numbered frame, j=1, 2, . . . , $k_{2i-1}$, i=1, 2, . . . , n+1.

The coefficients on the right side of $$\begin{cases} x = a_0 + a_1 t + a_2 t^2 \\ y = b_0 + b_1 t + b_2 t^2 \end{cases}$$

are calculated by using a least squares method, and fitted coordinates information $(t_{2i-1}, X_j^{2i-1}, Y_j^{2i-1})$ of each of the space debris in the odd-numbered frames is acquired.

Step 9. Multi-Point Adjustment on Coordinates of Space Debris in Even-Numbered Frames (in Search Mode)

In the search mode, the detection results of the space debris in n even-numbered frames and the multi-point adjustment method are used to acquire the coordinates information of each space debris in the even-numbered frames. Specifically:

Supposing that the number of space debris in the m-th even-numbered frame is $k_{2m}$, the measured coordinates information $(t_{2m}, x_h^{2m}, y_h^{2m})$ of each of the space debris is acquired, where $t_{2m}$ is the observation time corresponding to the m-th even-numbered frame, h=1, 2, . . . , $k_{2m}$, m=1, 2, . . . , n.

The coefficients on the right side of $$\begin{cases} x = a_0 + a_1 t + a_2 t^2 \\ y = b_0 + b_1 t + b_2 t^2 \end{cases}$$

are calculated by using the least squares method, and fitted coordinates information $(t_{2m}, X_h^{2m}, Y_h^{2m})$ of each of the space debris in the even-numbered frames is acquired.

Step 10. Astronomical Positioning of Space Debris in Odd-Numbered Frames

The coordinates information used for astronomical positioning is different in different observation modes.

(1) In the tracking mode, the plate constant model coefficients (for example, $$a^{2i-1}, b^{2i-1}, c^{2i-1}, \quad a_1^{2i-1}, b_1^{2i-1}, c_1^{2i-1}, d_1^{2i-1}, e_1^{2i-1}, f_1^{2i-1}$$
$$d^{2i-1}, e^{2i-1}, f^{2i-1} \text{ or } a_2^{2i-1}, b_2^{2i-1}, c_2^{2i-1}, d_2^{2i-1}, e_2^{2i-1}, f_2^{2i-1},$$

i 1, . . . , n+1) of the i-th odd-numbered frame and the measured coordinates information $(t_{2i-1}, x_j^{2i-1}, y_j^{2i-1})$, i 1, . . . , n+1 of $k_{2i-1}$ space debris in the i-th odd-numbered frame are used to complete the astronomical positioning of the space debris in the odd-numbered frame.

(2) In the search mode, the plate constant model coefficients (the same as above) of the i-th odd-numbered frame and the fitted coordinates information $(t_{2i-1}, X_j^{2i-1}, Y_j^{2i-1})$, i 1, . . . , n+1 of $k_{2i-1}$ space debris in the i-th odd-numbered frame are used to complete the astronomical positioning of the space debris in the odd-numbered frame.

Step 11. Astronomical Positioning of Space Debris in Even-Numbered Frames

Similarly, the coordinates information used for astronomical positioning is different in different observation modes.

(1) In the tracking mode, the plate constant model coefficients of $(2^m-1)$-th and $(2^m+1)$-th odd-numbered frames and the measured coordinates information $(t_{2m}, x_h^{2m}, y_h^{2m})$ of the space debris in the $2^m$-th even-numbered frame are used to complete the astronomical positioning of the space debris in the even-numbered frames.

(2) In the search mode, the plate constant model coefficients of the $(2^m-1)$-th and $(2^m+1)$-th odd-numbered frames and the fitted coordinates information $(t_{2m}, X_h^{2m}, Y_h^{2m})$ of the space debris in the $2^m$-th even-numbered frame after multi-point adjustment are used to complete the astronomical positioning of the space debris in the even-numbered frames.

In actual operation, real-time image acquisition and space debris detection and positioning can be performed in a streamlined manner.

Figure 2:
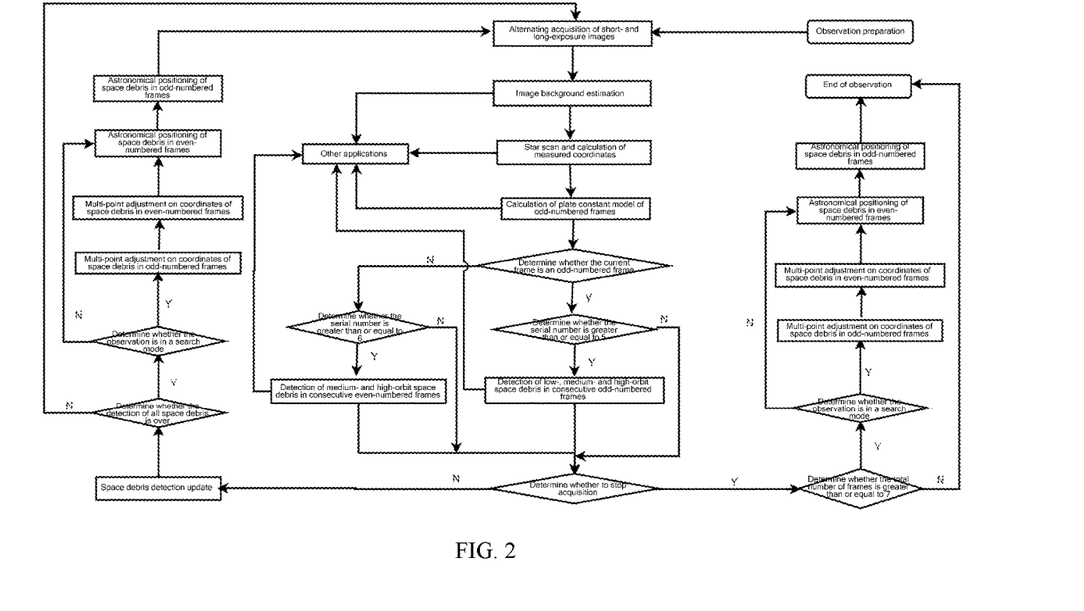
FIG. 2 is a flowchart of a specific embodiment of the present disclosure.

As shown in FIG. 2, an observation device acquires images in real time, and performs image background estimation, coordinates calculation, and odd-numbered frame plate constant model processing. Then it determines whether the current frame is an odd-numbered frame or an even-numbered frame, and whether the sequence of the current frame meets a minimum detection requirement for space debris. For example, in the above-mentioned space debris detection method based on star data retrieval, three or more odd/even-numbered frames are required. For odd-numbered frames, only when the total number of the frames reaches 5, the three odd-numbered frames, namely the measured frame, the third frame and the fifth frame are available for space debris detection. For even-numbered frames, only when the total number of the frames reaches 6, the three odd-numbered frames, namely the fitted frame, the fourth frame and the sixth frame are available for space debris detection. If the requirements are met, the newly acquired image is detected to determine whether there is a new space debris, and if yes, the 2D plane coordinates of the space debris are acquired. The odd-numbered frames and even-numbered frames are classified into different sequences for space debris identification. Then, it is determined whether the user needs to stop the image acquisition behavior.

(1) If the user chooses to stop the image acquisition behavior, it is determined whether the current total number of frames reaches the set number of frames. For example, if the set number of frames is 7, the corresponding n=3. In fact, n is at least equal to 3. The above analysis shows that to perform space debris detection of even-numbered frames, at least three even-numbered frames are required, that is, the total number of the frames must reach 6. However, the astronomical positioning of the $6^{th}$ frame (even-numbered frame) needs the $5^{th}$ and $7^{th}$ frames. Therefore, in practical applications, at least 7 frames are required to achieve the complete process of astronomical positioning of space debris. For the same reason, the total number of the acquired images is preferably an odd number.

If the current total number of frames does not reach the set minimum number of frames, the observation process is ended directly. Otherwise, according to the different working modes of the observation device, the astronomical positioning of the space debris is performed based on all the acquired images. Similarly, odd-numbered frames and even-numbered frames are classified into different sequences for astronomical positioning of space debris. In addition, if the working mode of the observation device is the search mode, first, the detection results of the space debris in n+1 odd frames and the multi-point adjustment method are used to acquire the fitted coordinates information of each space debris in the odd-numbered frames after the multi-point adjustment. Alternatively, the detection results of the space debris in n even-numbered frames and the multi-point adjustment method are used to acquire the fitted coordinates information of each space debris in the even-numbered frame after the multi-point adjustment. Then, the astronomical positioning of the space debris is performed by using the plate constant model coefficients and the fitted coordinates information of the space debris after the multi-point adjustment. Otherwise, the plate constant model coefficients and the measured coordinates information of the space debris are directly used to perform the astronomical positioning of the space debris.

(2) If the user chooses not to stop the image acquisition behavior, it is determined whether the detection of all space debris in the specified space area is over. If yes, the above astronomical positioning process is repeated. Otherwise, new image acquisition and new space debris information acquisition are continued.

As shown in FIG. 2, the present disclosure performs the steps of image acquisition, processing, space debris detection and astronomical positioning in a pipeline manner. The present disclosure has high space debris observation efficiency, which is convenient for users to grasp the observation progress in real time and adjust observation parameters in time.

Specific Embodiment 2

When the CCD camera uses alternating long and short exposures, the first frame may be discarded. In this way, the new first frame image is still a short exposure image. The space debris observation method based on alternating exposure times of a CCD camera is used to process the acquired images. Except for the discarded first frame, the total number of other frames is preferably greater than 7.

Specific Embodiment 3

Under the premise of a high camera frame rate, alternating short, medium and long exposures or alternating long, medium and short exposures may also be used. In this case, there are three sets of frames with different exposure times. The three sets of frames offer different observation efficiencies for space debris in different orbits. The space debris observation method based on alternating exposure times of a CCD camera is used to process the three sets of acquired frames to acquire more accurate observation results.

In other examples, more than three exposure times may be further set to acquire multiple sets of frames, and these sets of frames are analyzed one by one to acquire more accurate observation results.

Various aspects of the present disclosure are described with reference to the drawings, in which many embodiments of the present disclosure are shown. However, the embodiments of the present disclosure are not necessarily defined to include all aspects of the present disclosure. It should be understood that the various concepts and embodiments introduced above and the concepts and implementations described in more detail below may be implemented in any of many ways. Therefore, the concepts and embodiments of the present disclosure are not limited to any implementation. In addition, some aspects of the present disclosure may be used alone or in any appropriate combination with other aspects of the present disclosure.

Although the present disclosure is described as above with preferred embodiments, the present disclosure is not limited to the preferred embodiments. Those of ordinary knowledge in the art to which the present disclosure belongs may make various changes and modifications to the present disclosure without departing from the spirit and scope of the present disclosure. Therefore, the protection scope of the present disclosure should be subject to the claims.

What is claimed is:

1. A space debris observation method based on alternating exposure time of a charge coupled device (CCD) camera, comprising the following steps:
    S1: alternately acquiring, by the CCD camera, (2n+1) frames comprising space debris and background stars in a designated area based on a preset first exposure time and a preset second exposure time, wherein the first exposure time is used to acquire odd-numbered frames, the second exposure time is used to acquire even-numbered frames, and the first exposure time is less than the second exposure time; and n is a positive integer greater than or equal to 3;
    S2: estimating an image background;
    S3: subjecting each of the (2n+1) frames to a full-frame scan based on an image background estimation result, and calculating two-dimensional (2D) plane coordinates (x,y) of all stars in each of the (2n+1) frames, wherein an upper left corner of images serves as an origin of coordinates (0,0), a right side of the images indicates an increasing direction of an x-axis, and a lower side of the images indicates an increasing direction of a y-axis; and x indicates a distance between a position of a star in the images and the origin of the coordinates in an x-axis direction, and y indicates a distance between the position of the star in the images and the origin of the coordinates in a y-axis direction;

S4: calculating plate constant model coefficients of (n+1) odd-numbered frames based on the 2D plane coordinates (x,y) of all stars in the (n+1) odd-numbered frames;

S5: detecting, by using a preset detection method, low-orbit, medium-orbit and high-orbit space debris comprised in all the (n+1) odd-numbered frames based on (n+1) consecutive odd-numbered frames;

S6: detecting, by using the preset detection method, medium-orbit and high-orbit space debris comprised in all the even-numbered frames based on n consecutive even-numbered frames;

S7: calculating all detected space debris in the designated area based on respective space debris detection results of the odd-numbered frames and the even-numbered frames and a preset threshold; determining whether an observation is in a search mode; and proceeding to step S8 if yes, or proceeding to step S10 if not;

S8: in the search mode, acquiring, based on the space debris detection results of all the odd-numbered frames, coordinates information of each of the low-orbit, medium-orbit and high-orbit space debris comprised in the (n+1) odd-numbered frames after a multi-point adjustment on each of the (n+1) odd-numbered frames through a multi-point adjustment method;

S9: in the search mode, acquiring, based on the space debris detection results of all the even-numbered frames, coordinates information of each of the medium-orbit and high-orbit space debris comprised in the even-numbered frames after a multi-point adjustment on each of the even-numbered frames through the multi-point adjustment method;

S10: performing astronomical positioning of the low-orbit, medium-orbit and high-orbit space debris in the (n+1) odd-numbered frames based on the coordinates information of the low-orbit, medium-orbit and high-orbit space debris comprised in each of the (n+1) odd-numbered frames and the corresponding plate constant model coefficients of the (n+1) odd-numbered frames; and S11: performing astronomical positioning of the medium-orbit and high-orbit space debris in the even-numbered frames based on the coordinates information of the medium-orbit and high-orbit space debris in each of the even-numbered frames and the plate constant model coefficients of two adjacent odd-numbered frames.

2. The space debris observation method based on alternating exposure time of the CCD camera according to claim 1, wherein the S4: calculating the plate constant model coefficients of the (n+1) odd-numbered frames based on the 2D plane coordinates (x,y) of all the stars in the (n+1) odd-numbered frames comprises:

calculating, if a plate constant model is $$\begin{cases} \xi = a + bx + cy \\ \zeta = d + ex + fy \end{cases},$$

the plate constant model coefficients of the (n+1) odd-numbered frames as $$\begin{cases} a^{2i-1}, b^{2i-1}, c^{2i-1} \\ d^{2i-1}, e^{2i-1}, f^{2i-1} \end{cases},$$

i=1,2, . . . , n+1 based on the 2D plane coordinates (x,y) of all the stars in the (n+1) odd-numbered frames; and calculating, if the plate constant model is $$\begin{cases} \xi = a_1 + b_1 x + c_1 y + d_1 x^2 + e_1 xy + f_1 y^2 \\ \zeta = a_2 + b_2 x + c_2 y + d_2 x^2 + e_2 xy + f_2 y^2 \end{cases},$$

the plate constant model coefficients of the (n+1) odd-numbered frames as $$\begin{cases} a_1^{2i-1}, b_1^{2i-1}, c_1^{2i-1}, d_1^{2i-1}, e_1^{2i-1}, f_1^{2i-1} \\ a_2^{2i-1}, b_2^{2i-1}, c_2^{2i-1}, d_2^{2i-1}, e_2^{2i-1}, f_2^{2i-1} \end{cases},$$

i=1,2, . . . , n+1 based on the 2D plane coordinates (x,y) of all the stars in the (n+1) odd-numbered frames.

3. The space debris observation method based on alternating exposure time of the CCD camera according to claim 1, wherein in steps S5 and S6, the preset detection method comprises the following steps:

identifying and eliminating the background stars in all the images, acquiring track characteristics of remaining stars in all the images with the background stars eliminated, and detecting all space debris in the images.

4. The space debris observation method based on alternating exposure time of the CCD camera according to claim 1, wherein the S8: in the search mode, acquiring, based on the space debris detection results of all the odd-numbered frames, the coordinates information of each of the low-orbit, medium-orbit and high-orbit space debris in the (n+1) odd-numbered frames after the multi-point adjustment on each of the (n+1) odd-numbered frames through the multi-point adjustment method comprises:

supposing that there are $k_{2i-1}$ space debris in an i-th odd-numbered frame, and acquiring measured coordinates information $(t_{2i-1}, x_j^{2i-1}, y_j^{2i-1})$ of each of the $k_{2i-1}$ space debris, where $t_{2i-1}$ is an observation time corresponding to the i-th odd-numbered frame, j=1, 2, . . . , $k_{2i-1}$, i=1, 2, . . . , n+1; and calculating, by using a least squares method, $a_0$, $b_0$, $a_1$, $b_1$, $a_2$, $b_2$ based on $$\begin{cases} x = a_0 + a_1 t + a_2 t^2 \\ y = b_0 + b_1 t + b_2 t^2 \end{cases},$$

and acquiring fitted coordinates information $(t_{2i-1}, X_j^{2i-1}, Y_j^{2i-1})$ of each of the $k_{2i-1}$ space debris in the i-th odd-numbered frame after the lithe multi-point adjustment.

5. The space debris observation method based on alternating exposure time of the CCD camera according to claim 1, wherein the S9: in the search mode, acquiring, based on the space debris detection results of all the even-numbered frames, coordinates information of each of the medium-orbit and high-orbit space debris in the even-numbered frames after the multi-point adjustment on each of the even-numbered frames through the multi-point adjustment method comprises the following steps:

supposing that there are $k_{2m}$ space debris in an m-th even-numbered frame, and acquiring measured coordinates information $(t_{2m}, x_h^{2m}, y_h^{2m})$ of each of the space debris, where $k_{2m}$ space debris, wherein $t_{2m}$ is an observation time corresponding to the m-th even-numbered frame, h=1, 2, . . . , $k_{2m}$, m=1, 2, . . . , n; and calculating, by using a least squares method, $a_0$, $b_0$, $a_1$, $b_1$, $a_2$, $b_2$ based on $$\begin{cases} x = a_0 + a_1 t + a_2 t^2 \\ y = b_0 + b_1 t + b_2 t^2 \end{cases},$$

and acquiring fitted coordinates information $(t_{2m}, X_h^{2m}, Y_h^{2m})$ of each of the $k_{2m}$ space debris in the m-th even-numbered frame after the multi-point adjustment.

6. The space debris observation method based on alternating exposure time of the CCD camera according to claim 4, wherein the S10: performing the astronomical positioning of the low-orbit, medium-orbit and high-orbit space debris in the (n+1) odd-numbered frames based on the coordinates information of the low-orbit, medium-orbit and high-orbit space debris comprised in each of the (n+1) odd-numbered frames and the corresponding plate constant model coefficients of the (n+1) odd-numbered frames comprises the following steps:

performing, if the observation is in a tracking mode, the astronomical positioning of the low-orbit, medium-orbit and hi Th-orbit space debris in the (n+1) odd-numbered frames through the plate constant model coefficients of the i-th odd-numbered frame and the measured coordinates information $(t_{2i-1}, x_j^{2i-1}, y_j^{2i-1})$ of each of the $k_{2i-1}$ space debris in the i-th odd-numbered frame, j=1, 2, . . . , $k_{2i-1}$, i=1, 2, . . . , n+1; and performing, if the observation is in the search mode, the astronomical positioning of the low-orbit, medium-orbit and high-orbit space debris in the (n+1) odd-numbered frames through the plate constant model coefficients of the i-th odd-numbered frame and the fitted coordinates information $(t_{2i-1}, x_j^{2i-1}, y_j^{2i-1})$ of each of $k_{2i-1}$ the space debris in the i-th odd-numbered frame after the multi-point adjustment, j=1, 2, . . . , $k_{2i-1}$, i=1, 2, . . . , n+1.

7. The space debris observation method based on alternating exposure time of the CCD camera according to claim 5, wherein the S11: performing the astronomical positioning of the medium-orbit and high-orbit space debris in the even-numbered frames based on the coordinates information of the medium-orbit and high-orbit space debris in each of the even-numbered frames and the plate constant model coefficients of the two adjacent odd-numbered frames comprises the following steps:

performing, if the observation is in a tracking mode, the astronomical positioning of the medium-orbit and high-orbit space debris in the even-numbered frames through the plate constant model coefficients of (2m−1)-th and (2m+1)-th odd-numbered frames and the measured coordinates information $(t_{2m}, x_h^{2m}, y_h^{2m})$ of each of the $k_{2m}$ space debris in a $2^m$-th even-numbered frame; and performing, if the observation is in the search mode, the astronomical positioning of the medium-orbit and high-orbit space debris in the even-numbered frames through the plate constant model coefficients of the (2−1)-th and (2+1)-th odd-numbered frames and the fitted coordinates information $(t_{2m}, x_h^{2m}, y_h^{2m})$ of each of the $k_{2m}$ space debris in the $2_m$-th even-numbered frame after the multi-point adjustment.

8. The space debris observation method based on alternating exposure time of the CCD camera according to claim 1, further comprising:

sending the image background estimation result, calculated 2D plane coordinates (x,y) of all the stars in each of the (2n+1) frames, detection results of the space debris in each of the images, and astronomical positioning results to a measurement system.

* * * * *